(12) United States Patent
Ono

(10) Patent No.: US 11,268,731 B2
(45) Date of Patent: Mar. 8, 2022

(54) AIR CONDITIONER

(71) Applicant: Mitsubishi Electric Corporation, Tokyo (JP)

(72) Inventor: Yoshihito Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 16/310,013

(22) PCT Filed: Sep. 23, 2016

(86) PCT No.: PCT/JP2016/078052
§ 371 (c)(1),
(2) Date: Dec. 14, 2018

(87) PCT Pub. No.: WO2018/055736
PCT Pub. Date: Mar. 29, 2018

(65) Prior Publication Data
US 2019/0257541 A1 Aug. 22, 2019

(51) Int. Cl.
*F24F 11/61* (2018.01)
*F24F 11/32* (2018.01)
(Continued)

(52) U.S. Cl.
CPC .............. *F24F 11/61* (2018.01); *F24F 11/32* (2018.01); *F24F 11/65* (2018.01); *G05B 15/02* (2013.01);
(Continued)

(58) Field of Classification Search
CPC .. F24F 11/61; F24F 11/32; F24F 11/65; F24F 11/56; G05B 15/02; G05B 19/0428;
(Continued)

(56) References Cited

U.S. PATENT DOCUMENTS 9,328,727 B2* 5/2016 Koehl ................... G05D 16/202
2005/0223723 A1* 10/2005 Crane ..................... F25B 49/025
62/175
(Continued)

FOREIGN PATENT DOCUMENTS

CN 102927655 A 2/2013
JP S59-226902 A 12/1984
(Continued)

OTHER PUBLICATIONS

Office Action dated Jan. 31, 2019 issued in corresponding EP patent application No. 16904239.7.
(Continued)

*Primary Examiner* — Zoheb S Imtiaz
(74) *Attorney, Agent, or Firm* — Posz Law Group, PLC

(57) ABSTRACT

An air conditioner includes a main control unit, and a motor-driving control unit. The main control unit transmits, at every first time, an instruction for rotating the motor to the motor-driving control unit. The motor-driving control unit outputs, on the basis of the instruction, an instruction for rotating the motor to the inverter output unit. When the motor-driving control unit does not receive a new instruction for rotating the motor from the main control unit before the first time elapses from a time when the motor-driving control unit receives the instruction for rotating the motor from the main control unit last, the motor-driving control unit outputs an instruction for continuing operation based on the instruction for rotating the motor received from the main control unit at an immediately preceding time to the inverter output unit.

10 Claims, 6 Drawing Sheets

(51) Int. Cl.
*F24F 11/65* (2018.01)
*H02P 3/06* (2006.01)
*G05B 15/02* (2006.01)
*G05B 19/042* (2006.01)
*F24F 11/56* (2018.01)

(52) U.S. Cl.
CPC ............ *G05B 19/0428* (2013.01); *H02P 3/06* (2013.01); *F24F 11/56* (2018.01); *F25B 2600/021* (2013.01); *G05B 2219/24139* (2013.01); *G05B 2219/2614* (2013.01)

(58) Field of Classification Search
CPC .. G05B 2219/24139; G05B 2219/2614; H02P 3/06; F25B 2600/021
See application file for complete search history.

(56) References Cited

U.S. PATENT DOCUMENTS

| | | |
|---|---|---|
| 2009/0038325 A1 | 2/2009 | Yagi et al. |
| 2011/0297363 A1 | 12/2011 | Takata et al. |
| 2015/0316912 A1 | 11/2015 | McKinzie |
| 2017/0302214 A1* | 10/2017 | Marcinkiewicz ... H02M 1/4225 |

FOREIGN PATENT DOCUMENTS

| | | |
|---|---|---|
| JP | S61-030103 U | 2/1986 |
| JP | H07-293981 A | 11/1995 |
| JP | H09-282002 A | 10/1997 |
| JP | H11-045121 A | 2/1999 |
| JP | 2007-085610 A | 4/2007 |
| JP | 2007-232346 A | 9/2007 |
| JP | 2011-145014 A | 7/2011 |
| JP | 2012-122645 A | 6/2012 |

OTHER PUBLICATIONS

Office Action dated Apr. 27, 2020 issued in corresponding CN patent application No. 201680089165.8 ( and English translation).
International Search Report of the International Searching Authority dated Dec. 13, 2016 for the corresponding international application No. PCT/JP2016/078052 (and English translation).
Extended European Search Report dated Jun. 22, 2018 issued in corresponding EP patent application No. 16904239.7.
Office Action dated Sep. 21, 2020 from the CN patent office in application No. 201680089165.8 ( and English machine translation).

* cited by examiner

AIR CONDITIONER

CROSS REFERENCE TO RELATED APPLICATION

This application is a U.S. national stage application of PCT/JP2016/078052 filed on Sep. 23, 2016, the contents of which are incorporated herein by reference.

FIELD

The present invention relates to an air conditioner.

BACKGROUND

A conventional air conditioner includes a first controller and a second controller that perform control. The first controller and the second controller respectively include microcomputers (see, for example, Patent Literature 1).

CITATION LIST

Patent Literature

Patent Literature 1: Japanese Patent Application Laid-Open No. S59-226902

SUMMARY

Technical Problem

In the conventional technology described above, when the microcomputer malfunctions, the operation of a controlled apparatus immediately stops. It is requested that an air conditioner including a main control unit and a motor-driving control unit is provided, the air conditioner continuing operation even if communication between the main control unit and the motor-driving control unit becomes abnormal rather than immediately stopping when the communication becomes abnormal.

The present invention has been devised in view of the above, and an object of the invention is to obtain an air conditioner that continues operation even if communication between a main control unit and a motor-driving control unit becomes abnormal.

Solution to Problem

To solve the problem and achieve the object, an air conditioner according to the present invention includes: a main control unit to perform control for rotating a motor; a motor-driving control unit to perform, on the basis of the control by the main control unit, control for rotating the motor; and an inverter output unit to output, on the basis of the control by the motor-driving control unit, a signal for rotating the motor to the motor. The main control unit transmits, at every first time, an instruction for rotating the motor to the motor-driving control unit. The motor-driving control unit outputs, on the basis of the instruction for rotating the motor transmitted from the main control unit, an instruction for rotating the motor to the inverter output unit. When the motor-driving control unit does not receive a new instruction for rotating the motor from the main control unit before the first time elapses from a time when the motor-driving control unit receives the instruction for rotating the motor from the main control unit last, the motor-driving control unit outputs an instruction for continuing operation based on an instruction for rotating the motor received from the main control unit at an immediately preceding time to the inverter output unit.

Advantageous Effects of Invention

The air conditioner according to the present invention achieves an effect that it is possible to continue the operation even if communication between the main control unit and the motor-driving control unit becomes abnormal.

DESCRIPTION OF EMBODIMENTS

An air conditioner according to an embodiment of the present invention will be explained in detail below with reference to the drawings. Note that the present invention is not limited by the embodiment.

Embodiment

Figure 1:
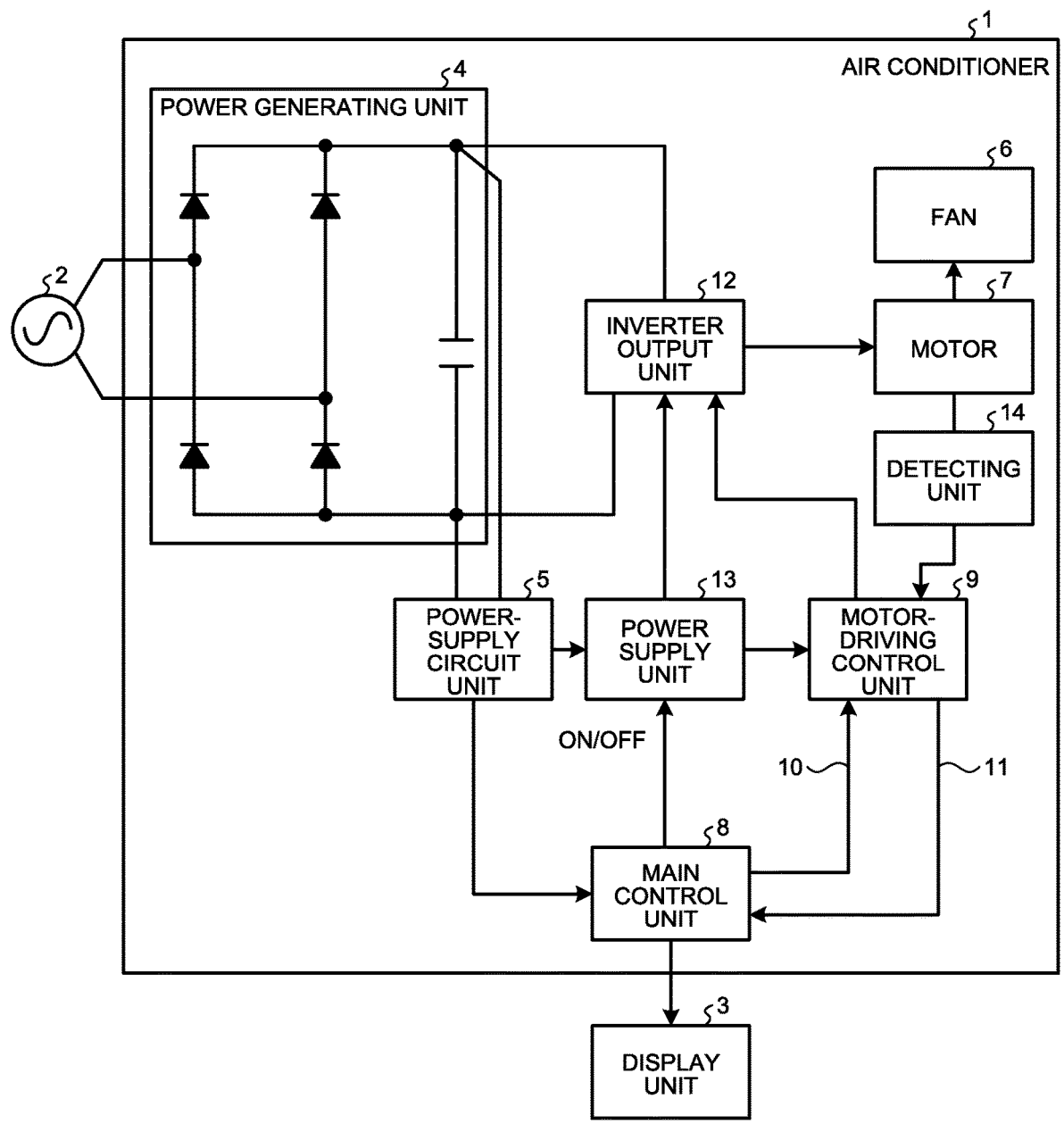
FIG. 1 is a diagram illustrating the configuration of an air conditioner in an embodiment.

First, the configuration of an air conditioner 1 in an embodiment will be explained. FIG. 1 is a diagram illustrating the configuration of the air conditioner 1 in the embodiment. In FIG. 1, to explain the air conditioner 1, a commercial power supply 2 and a display unit 3 that displays information are illustrated together with the air conditioner 1. The air conditioner 1 includes a power generating unit 4 that is connected to the commercial power supply 2 and generates a direct-current voltage from an alternating-current voltage supplied from the commercial power supply 2. The power generating unit 4 includes a plurality of diodes and a plurality of capacitors.

The air conditioner 1 further includes a power-supply circuit unit 5 connected to the power generating unit 4, a fan 6 used when the air is supplied to the outside of the air conditioner 1, a motor 7 that drives the fan 6, and a main control unit 8 that performs control for rotating the motor 7. In the embodiment, the motor 7 drives the fan 6. However, the motor 7 can be used for a purpose other than the driving of the fan 6. The main control unit 8 is connected to the power-supply control unit 5. The power-supply control unit 5 supplies electric power of the direct-current voltage generated by the power generating unit 4 to the main control unit 8.

The air conditioner 1 further includes a motor-driving control unit 9 that performs, on the basis of the control by the main control unit 8, control for rotating the motor 7. The air conditioner 1 further includes a first communication path 10, which is a communication path of information from the main control unit 8 to the motor-driving control unit 9, and a second communication path 11, which is a communication path of information from the motor-driving control unit 9 to the main control unit 8. The first communication path 10 and the second communication path 11 can be separate communication paths but can be an integral communication path.

The main control unit 8 transmits, at every first time determined in advance, an instruction for rotating the motor 7 to the motor-driving control unit 9 via the first communication path 10. Every time the motor-driving control unit 9 receives the instruction for rotating the motor 7 from the main control unit 8, the motor-driving control unit 9 transmits a response, which indicates that the instruction is received, to the main control unit 8 via the second communication path 11. The first time is, for example, 500 milliseconds.

The air conditioner 1 further includes an inverter output unit 12 that outputs, on the basis of the control by the motor-driving control unit 9, a signal for rotating the motor 7 to the motor 7. The motor 7 is driven on the basis of the signal output from the inverter output unit 12. The motor-driving control unit 9 outputs, on the basis of the instruction for rotating the motor 7 transmitted from the main control unit 8, an instruction for rotating the motor 7 to the inverter output unit 12. The inverter output unit 12 is connected to the power generating unit 4.

When, because abnormality occurs in the first communication path 10, the motor-driving control unit 9 does not receive a new instruction for rotating the motor 7 from the main control unit 8 before the first time elapses from a time when the motor-driving control unit 9 receives an instruction for rotating the motor 7 from the main control unit 8 last, the motor-driving control unit 9 outputs an instruction for continuing operation based on an instruction for rotating the motor 7 received from the main control unit 8 at the immediately preceding time to the inverter output unit 12. In the following explanation, to simplify the explanation, when the motor-driving control unit 9 does not receive a new instruction for rotating the motor 7 from the main control unit 8 before the first time elapses from the time when the motor-driving control unit 9 receives the instruction for rotating the motor 7 from the main control unit 8 last, the instruction for rotating the motor 7 received by the motor-driving control unit 9 from the main control unit 8 at the immediately preceding time is described as "last instruction". When receiving the instruction for continuing the operation based on the last instruction from the motor-driving control unit 9, the inverter output unit 12 outputs a signal for continuing the operation based on the last instruction to the motor 7.

The air conditioner 1 further includes a power supply unit 13 connected to each of the motor-driving control unit 9 and the inverter output unit 12. The power supply unit 13 is connected to the power-supply circuit unit 5. The power-supply circuit unit 5 supplies electric power of a direct-current voltage generated by the power generating unit 4 to the power supply unit 13. The power supply unit 13 can supply the electric power to each of the motor-driving control unit 9 and the inverter output unit 12.

The main control unit 8 controls ON and OFF of the power supply unit 13. When the power supply unit 13 changes from an OFF state to an ON state according to the control by the main control unit 8, the power supply unit 13 starts power supply to the motor-driving control unit 9 and the inverter output unit 12. When the power supply unit 13 changes from the ON state to the OFF state according to the control by the main control unit 8, the power supply unit 13 stops the power supply to the motor-driving control unit 9 and the inverter output unit 12.

The air conditioner 1 further includes a detecting unit 14 that detects a rotating direction and the number of revolutions of the motor 7. The main control unit 8 and the motor-driving control unit 9 have functions other than the functions explained above. The functions other than the functions explained above will be explained when the operation of the air conditioner 1 is explained.

Figure 2:
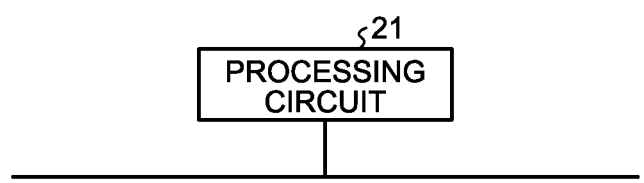
FIG. 2 is a diagram illustrating a processing circuit that realizes at least a part of components configuring a power-supply circuit unit, a main control unit, a motor-driving control unit, an inverter output unit, a power supply unit, and a detecting unit included in the air conditioner in the embodiment.

At least a part of the functions of the power-supply circuit unit 5, the main control unit 8, the motor-driving control unit 9, the inverter output unit 12, the power supply unit 13, and the detecting unit 14 included in the air conditioner 1 can be realized by a processing circuit 21. FIG. 2 is a diagram illustrating the processing circuit 21 that realizes at least a part of components configuring the power-supply circuit unit 5, the main control unit 8, the motor-driving control unit 9, the inverter output unit 12, the power supply unit 13, and the detecting unit 14 included in the air conditioner 1 in the embodiment.

Note that a part of the power-supply circuit unit 5 can be realized by the processing circuit 21. A portion of the power-supply circuit unit 5 not realized by the processing circuit 21 is hardware separate from the processing circuit 21. The entire power-supply circuit unit 5 can be hardware separate from the processing circuit 21. A part of the inverter output unit 12 can also be realized by the processing circuit 21. A portion of the inverter output unit 12 not realized by the processing circuit 21 is hardware separate from the processing circuit 21. The entire inverter output unit 12 can be hardware separate from the processing circuit 21. A part of the power supply unit 13 can also be realized by the processing circuit 21. A portion of the power supply unit 13 not realized by the processing circuit 21 is hardware separate from the processing circuit 21. The entire power supply unit 13 can be hardware separate from the processing circuit 21.

The processing circuit 21 is dedicated hardware. That is, the processing circuit 21 is, for example, a single circuit, a composite circuit, a programmed processor, a parallel-programmed processor, an Application Specific Integrated Circuit (ASIC), a Field-Programmable Gate Array (FPGA), or a combination of the foregoing. A part of the power-supply circuit unit 5, the main control unit 8, the motor-driving control unit 9, the inverter output unit 12, the power supply unit 13, and the detecting unit 14 can be dedicated hardware separate from the remaining part.

Figure 3:
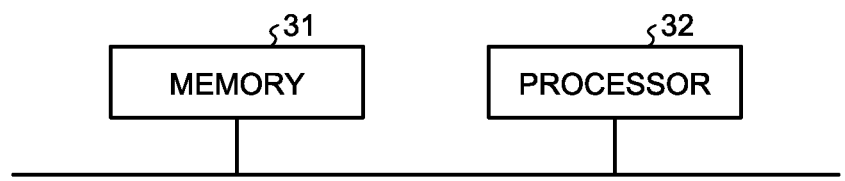
FIG. 3 is a diagram illustrating a processor that realizes at least a part of functions of the power-supply circuit unit, the main control unit, the motor-driving control unit, the inverter output unit, the power supply unit, and the detecting unit included in the air conditioner in the embodiment.

At least functions of the power-supply circuit unit 5, the main control unit 8, the motor-driving control unit 9, the inverter output unit 12, the power supply unit 13, and the detecting unit 14 included in the air conditioner 1 can be realized by a processor 32 that executes a program stored in a memory 31. FIG. 3 is a diagram illustrating the processor 32 that realizes at least a part of the functions of the power-supply circuit unit 5, the main control unit 8, the motor-driving control unit 9, the inverter output unit 12, the power supply unit 13, and the detecting unit 14 included in the air conditioner 1 in the embodiment. The processor 32 is a Central Processing Unit (CPU), a processing device, an arithmetic device, a microprocessor, a microcomputer, or a Digital Signal Processor (DSP). The memory 31 is also illustrated in FIG. 3.

Note that a part of the power-supply circuit unit 5 can be realized by the processor 32. A portion of the power-supply circuit unit 5 not realized by the processor 32 is hardware separate from the processor 32. The entire power-supply circuit unit 5 can be hardware separate from the processor 32. A part of the inverter output unit 12 can also be realized by the processor 32. A portion of the inverter output unit 12 not realized by the processor 32 is hardware separate from the processor 32. The entire inverter output unit 12 can be hardware separate from the processor 32. A part of the power supply unit 13 can also be realized by the processor 32. A portion of the power supply unit 13 not realized by the processor 32 is hardware separate from the processor 32. The entire power supply unit 13 can be hardware separate from the processor 32.

When at least a part of the functions of the power-supply circuit unit 5, the main control unit 8, the motor-driving control unit 9, the inverter output unit 12, the power supply unit 13, and the detecting unit 14 is realized by the processor 32, the part of the functions is realized by the processor 32 and software, firmware, or a combination of the software and the firmware. The software or the firmware is described as a program and stored in the memory 31. The processor 32 reads out and executes the program stored in the memory 31 to thereby realize at least a part of the functions of the power-supply circuit unit 5, the main control unit 8, the motor-driving control unit 9, the inverter output unit 12, the power supply unit 13, and the detecting unit 14.

That is, when at least a part of the functions of the power-supply circuit unit 5, the main control unit 8, the motor-driving control unit 9, the inverter output unit 12, the power supply unit 13, and the detecting unit 14 is realized by the processor 32, the air conditioner 1 includes the memory 31 for storing a program in which steps executed by a part of the power-supply circuit unit 5, the main control unit 8, the motor-driving control unit 9, the inverter output unit 12, the power supply unit 13, and the detecting unit 14 are executed as a result. The program stored in the memory 31 can also be considered a program for causing a computer to execute a procedure or a method executed by a part of the power-supply circuit unit 5, the main control unit 8, the motor-driving control unit 9, the inverter output unit 12, the power supply unit 13, and the detecting unit 14.

The memory 31 is, for example, a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read-Only Memory (EEPROM), a magnetic disk, a flexible disk, an optical disk, a compact disc, a minidisc, or a Digital Versatile Disk (DVD), or the like.

Concerning a plurality of functions of the power-supply circuit unit 5, the main control unit 8, the motor-driving control unit 9, the inverter output unit 12, the power supply unit 13, and the detecting unit 14, a part of the functions can be realized by hardware and the remaining part of the functions can be realized by software or firmware. Thus, the functions of the power-supply circuit unit 5, the main control unit 8, the motor-driving control unit 9, the inverter output unit 12, the power supply unit 13, and the detecting unit 14 can be realized by the hardware, the software, the firmware, or a combination of the foregoing.

Figure 4:
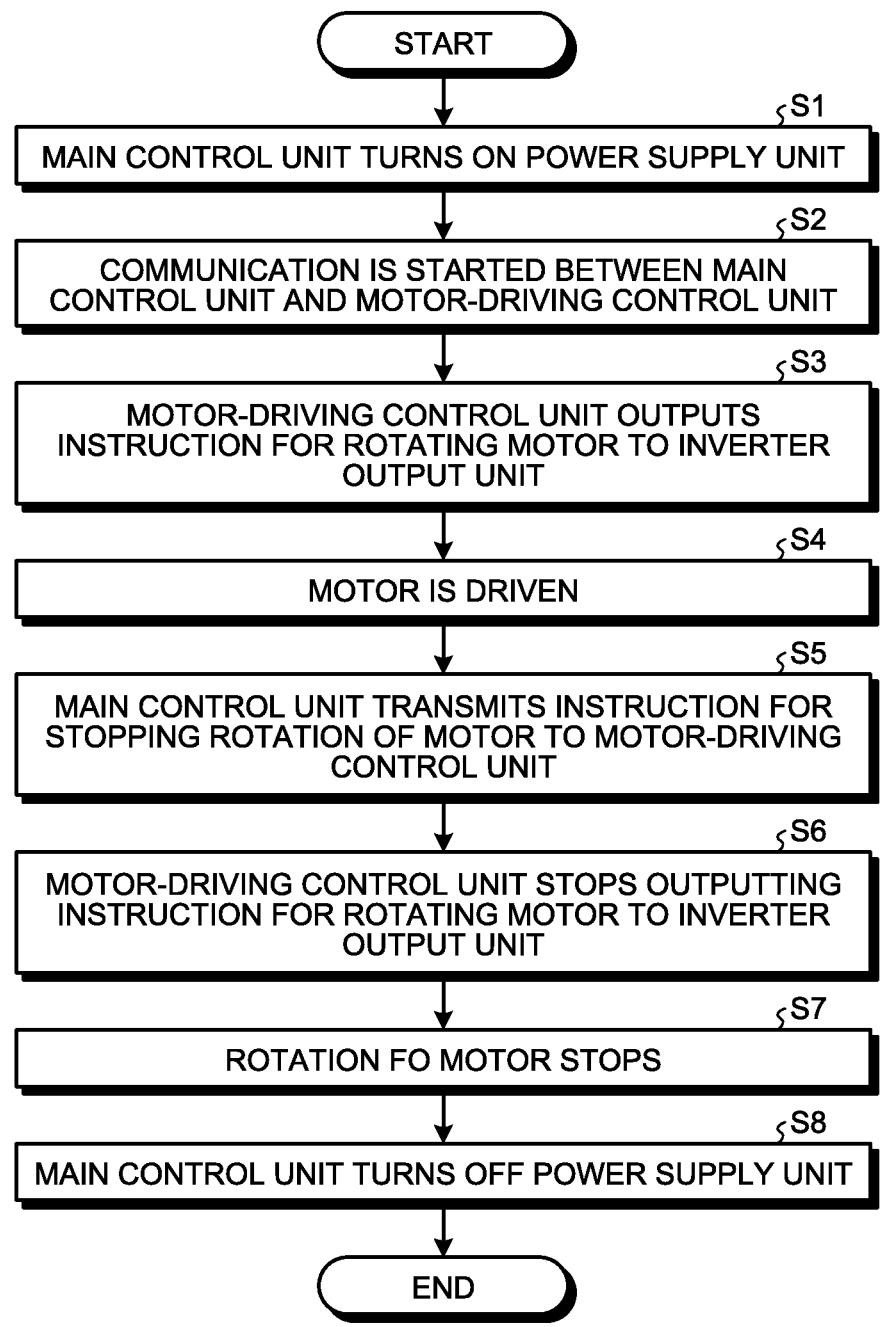
FIG. 4 is a flowchart illustrating a procedure of the operation of the air conditioner at the time when a motor is driven in the embodiment.

The operation of the air conditioner 1 in the embodiment will be explained. When the power generating unit 4 is connected to the commercial power supply 2, the power generating unit 4 generates a direct-current voltage and supplies the generated direct-current voltage to the power-supply circuit unit 5 and the inverter output unit 12. When receiving the direct-current voltage, the power-supply circuit unit 5 supplies the direct-current voltage to each of the main control unit 8 and the power supply unit 13. FIG. 4 is a flowchart illustrating a procedure of the operation of the air conditioner 1 at the time when the motor 7 is driven in the embodiment.

When driving the motor 7, first, the main control unit 8 turns on the power supply unit 13 (S1). That is, the main control unit 8 operates the power supply unit 13. When the power supply unit 13 is turned on, the power supply unit 13 supplies electric power to the motor-driving control unit 9. A state of the motor-driving control unit 9 changes to an operable state. After the operation at step S1 is executed, communication is started between the main control unit 8 and the motor-driving control unit 9 (S2).

That is, at step S2, the main control unit 8 transmits, at every first time determined in advance, an instruction for rotating the motor 7 to the motor-driving control unit 9 via the first communication path 10. Every time the motor-driving control unit 9 receives the instruction from the main control unit 8, the motor-driving control unit 9 transmits a response, which indicates that the instruction is received, to the main control unit 8 via the second communication path 11.

When receiving the instruction for rotating the motor 7 from the main control unit 8, the motor-driving control unit 9 outputs, on the basis of the instruction transmitted from the main control unit 8, an instruction for rotating the motor 7 to the inverter output unit 12 (S3). The inverter output unit 12 outputs, on the basis of the instruction output from the motor-driving control unit 9, a signal for rotating the motor 7 to the motor 7. The motor 7 is driven according to the signal (S4). That is, the motor 7 rotates according to the signal.

When stopping the driving of the motor 7, the main control unit 8 transmits an instruction for stopping the rotation of the motor 7 to the motor-driving control unit 9 via the first communication path 10 (S5). Specifically, the main control unit 8 transmits an instruction for setting a target number of revolutions to 0 revolution per minute (rpm) to the motor-driving control unit 9 (S5). When receiving the instruction for stopping the rotation of the motor 7 from the main control unit 8, the motor-driving control unit 9 transmits a response, which indicates that the instruction for stopping the rotation of the motor 7 is received, to the main control unit 8 via the second communication path 11 and stops outputting the signal for rotating the motor 7 to the inverter output unit 12 (S6).

When the signal for rotating the motor 7 is not received from the motor-driving control unit 9, the inverter output unit 12 outputs a signal for stopping the rotation of the motor 7 to the motor 7. The rotation of the motor 7 stops according to the signal (S7). After the rotation of the motor 7 stops, the main control unit 8 turns off the power supply unit 13 (S8).

Figure 5:
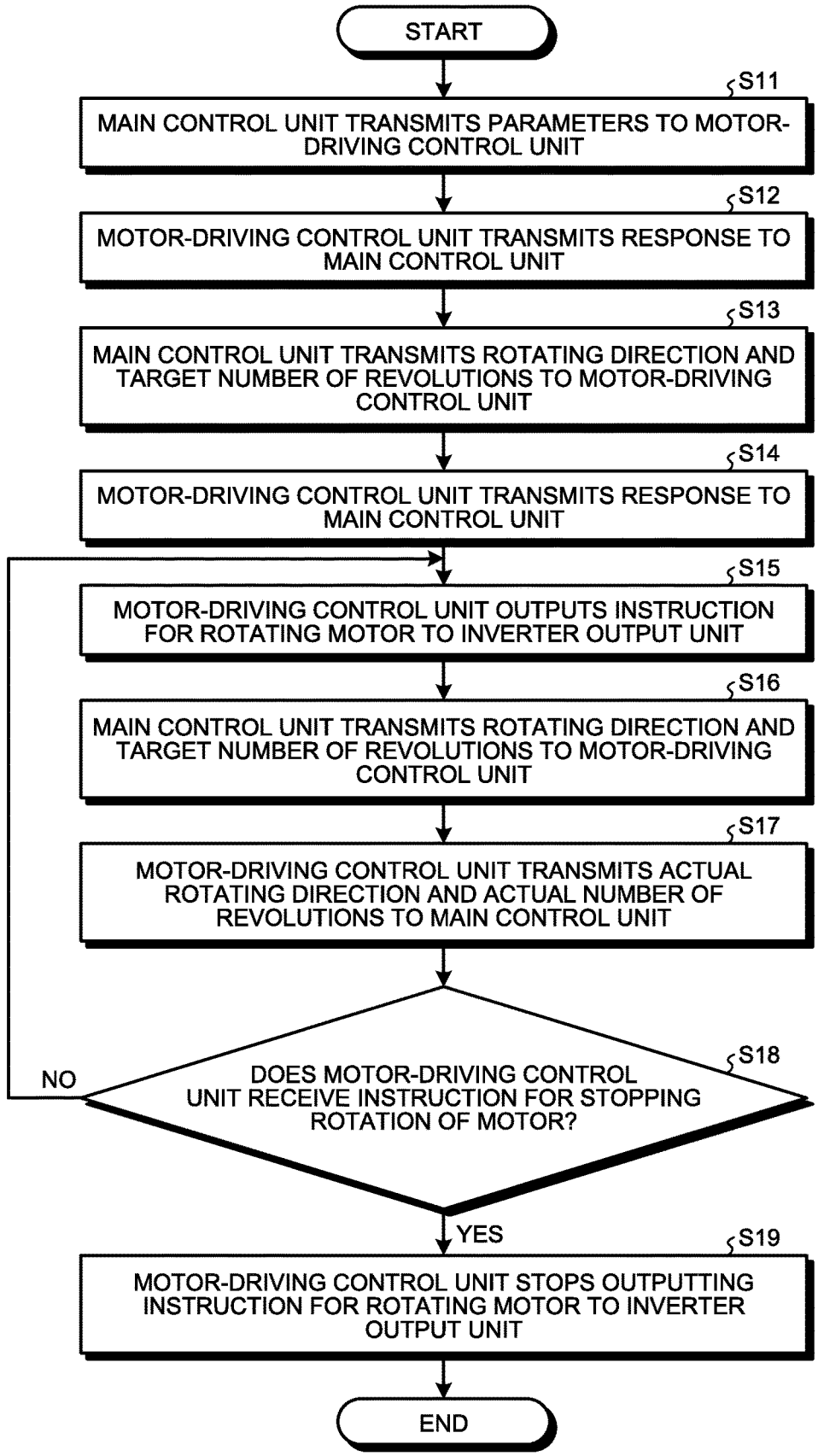
FIG. 5 is a flowchart illustrating a procedure of operation concerning communication between the main control unit and the motor-driving control unit included in the air conditioner in the embodiment.

As explained above, when the motor 7 is driven, the main control unit 8 and the motor-driving control unit 9 communicate via the first communication path 10 and the second communication path 11. Operation concerning the communication performed between the main control unit 8 and the motor-driving control unit 9 will be explained with reference to FIG. 5. FIG. 5 is a flowchart illustrating a procedure of the operation concerning the communication between the main control unit 8 and the motor-driving control unit 9 included in the air conditioner 1 in the embodiment.

After turning on the power supply unit 13, the main control unit 8 transmits parameters necessary for rotating the motor 7 to the motor-driving control unit 9 (S11). When receiving the parameters from the main control unit 8, the motor-driving control unit 9 transmits a response, which indicates that the parameters are received, to the main control unit 8 (S12). Thereafter, the main control unit 8 transmits information for specifying a rotating direction and a target number of revolutions of the motor 7 to the motor-driving control unit 9 (S13).

When receiving the information for specifying the rotating direction and the target number of revolutions, the motor-driving control unit 9 transmits a response, which indicates that the information for specifying the rotating direction and the target number of revolutions is received, to the main control unit 8 (S14). Thereafter, the motor-driving control unit 9 outputs, on the basis of the information for specifying the rotating direction and the target number of revolutions of the motor 7 transmitted from the main control unit 8, an instruction for rotating the motor 7 according to the rotating direction and the target number of revolutions to the inverter output unit 12 (S15). The inverter output unit 12 outputs, on the basis of the instruction output from the motor-driving control unit 9, a signal for rotating the motor 7 according to the rotating direction and the target number of revolutions to the motor 7. The motor 7 rotates such that the number of revolutions approaches the target number of revolutions in the rotating direction.

When the motor 7 rotates, the detecting unit 14 detects an actual rotating direction and an actual number of revolutions of the motor 7. The motor-driving control unit 9 performs, on the basis of a result of the detection by the detecting unit 14, control for rotating the motor 7 at the target number of revolutions. That is, the motor-driving control unit 9 outputs, on the basis of the result of the detection by the detecting unit 14, an instruction for rotating the motor 7 in the rotating direction and at the target number of revolutions to the inverter output unit 12.

The main control unit 8 repeatedly transmits the information for specifying the rotating direction and the target number of revolutions of the motor 7 to the motor-driving control unit 9 (S16). Every time the motor-driving control unit 9 receives the information for specifying the rotating direction and the target number of revolutions from the main control unit 8, the motor-driving control unit 9 transmits information for specifying the actual rotating direction and the actual number of revolutions of the motor 7 detected by the detecting unit 14 to the main control unit 8 (S17).

The motor-driving control unit 9 determines whether the instruction for stopping the rotation of the motor 7 is received from the main control unit 8 (S18). When the motor-driving control unit 9 determines that the instruction for stopping the rotation of the motor 7 is not received from the main control unit 8 (No at S18), the operation at step S15 explained above is performed following the operation at step S18.

That is, when the motor 7 is driven, the operations at step S15 to step S18 explained above are repeatedly performed at a first time interval until the motor-driving control unit 9 receives the instruction for stopping the rotation of the motor 7 from the main control unit 8. Note that the main control unit 8 changes one or both of the rotating direction and the target number of revolutions according to an instruction performed on the air conditioner 1 by a user using a remote operation apparatus or according to the atmosphere of a room in which the air conditioner 1 is set. The remote operation apparatus is not illustrated in the figures.

When receiving the instruction for stopping the rotation of the motor 7 from the main control unit 8 (Yes at S18), the motor-driving control unit 9 stops outputting the instruction for rotating the motor 7 according to the rotating direction and the target number of revolutions to the inverter output unit 12 (S19).

Figure 6:
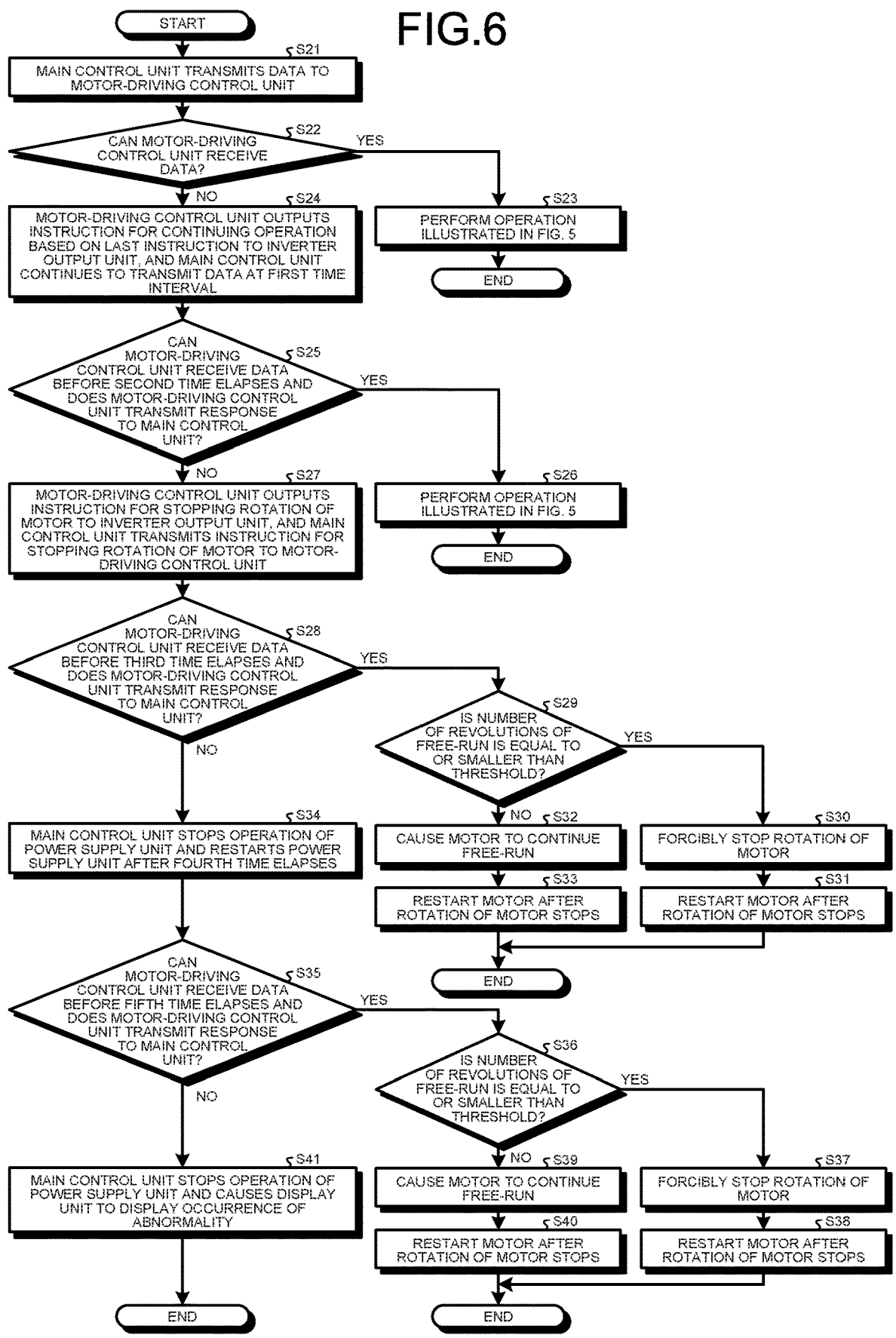
FIG. 6 is a flowchart illustrating a procedure of the air conditioner in the embodiment at the time when abnormality occurs in transmission of information from the main control unit to the motor-driving control unit.

The operation of the air conditioner 1 at the time when abnormality occurs in the communication between the main control unit 8 and the motor-driving control unit 9 will be explained. The abnormality of the communication includes abnormality of transmission of information from the main control unit 8 to the motor-driving control unit 9 and abnormality of transmission of information from the motor-driving control unit 9 to the main control unit 8. First, the operation of the air conditioner 1 at the time when abnormality occurs in the transmission of the information from the main control unit 8 to the motor-driving control unit 9 will be explained. FIG. 6 is a flowchart illustrating a procedure of the operation of the air conditioner 1 in the embodiment at the time when the abnormality occurs in the transmission of the information from the main control unit 8 to the motor-driving control unit 9.

The main control unit 8 transmits data to the motor-driving control unit 9 (S21). When the motor-driving control unit 9 can receive the data transmitted from the main control unit 8 (Yes at S22), the air conditioner 1 performs the operation explained with reference to FIG. 5 (S23). A specific example of the data is an instruction for rotating the motor 7.

When the motor-driving control unit 9 cannot receive the data transmitted from the main control unit 8 (No at S22), that is, when, because abnormality occurs in the first communication path 10, the motor-driving control unit 9 does not receive a new instruction for rotating the motor 7 from the main control unit 8 before the first time elapses since receiving the instruction for rotating the motor 7 from the main control unit 8 (No at S22), the air conditioner 1 performs operation at step S24 explained below. A case when the motor-driving control unit 9 cannot receive the data transmitted from the main control unit 8 (No at S22) is a case when the motor-driving control unit 9 does not receive an instruction for rotating the motor 7 from the main control unit 8 before the first time elapses since receiving the last instruction for rotating the motor 7 from the main control unit 8.

When the motor-driving control unit 9 cannot receive the data transmitted from the main control unit 8 (No at S22), the motor-driving control unit 9 outputs, to the inverter output unit 12, an instruction for continuing operation based on an instruction for rotating the motor 7 received from the main control unit 8 at the immediately preceding time (S24). That is, the motor-driving control unit 9 outputs an instruction for continuing the operation based on the last instruction to the inverter output unit 12 (S24). When receiving the instruction for continuing the operation based on the last instruction from the motor-driving control unit 9, the inverter output unit 12 outputs a signal for continuing the operation based on the last instruction to the motor 7. The motor 7 continues the operation based on the last instruction. Because the motor-driving control unit 9 does not receive the data transmitted from the main control unit 8, the main control unit 8 does not receive a response from the motor-driving control unit 9. However, the main control unit 8 continues to transmit the data to the motor-driving control unit 9 at the first time interval.

When the motor-driving control unit 9 can receive the data from the main control unit 8 before a second time determined in advance longer than the first time elapses since receiving the last instruction from the main control unit 8 and transmits a response, which indicates that the data is received, to the main control unit 8 (Yes at S25), the air conditioner 1 performs the operation explained with reference to FIG. 5 (S26). The second time is, for example, 5000 milliseconds.

When the motor-driving control unit 9 does not receive the data from the main control unit 8 before the second time elapses since receiving the last instruction from the main control unit 8 and does not transmit a response, which indicates that the data is received, to the main control unit 8 (No at S25), that is, when the motor-driving control unit 9 does not receive the instruction for rotating the motor 7 before the second time elapses since receiving the last instruction from the main control unit 8, the air conditioner 1 performs operation at step S27 explained below.

That is, the motor-driving control unit 9 stops outputting the instruction for continuing the operation based on the last instruction to the inverter output unit 12 and outputs an instruction for stopping the rotation of the motor 7 to the inverter output unit 12 (S27). When receiving the instruction for stopping the rotation of the motor 7 from the motor-driving control unit 9, the inverter output unit 12 outputs a signal for stopping the rotation of the motor 7 to the motor 7. The motor 7 starts operation for stopping the rotation. In addition, the main control unit 8 transmits an instruction for stopping the rotation of the motor 7 to the motor-driving control unit 9 (S27). Specifically, the main control unit 8 transmits an instruction for setting the target number of revolutions to 0 rpm to the motor-driving control unit 9 (S27).

When the motor-driving control unit 9 can receive the data from the main control unit 8 before a third time determined in advance elapses since outputting the instruction for stopping the rotation of the motor 7 to the inverter output unit 12 and transmits a response to the main control unit 8 (Yes at S28), that is, when the motor-driving control unit 9 can receive the data from the main control unit 8 before the third time elapses since the operation for stopping the rotation of the motor 7 is started and transmits a response to the main control unit 8 (Yes at S28), the main control unit 8 performs operation at step S29 explained below. A case of Yes at step S28 is a case when the state of the communication from the main control unit 8 to the motor-driving control unit 9 is restored. The third time is, for example, 5000 milliseconds.

When the state of the communication from the main control unit 8 to the motor-driving control unit 9 is restored (Yes at S28), the main control unit 8 determines whether the number of revolutions of free-run of the motor 7 is equal to or smaller than a threshold determined in advance (S29). Specifically, the number of revolutions of the free-run of the motor 7 is detected by the detecting unit 14. The motor-driving control unit 9 transmits data for specifying the number of revolutions detected by the detecting unit 14 to the main control unit 8 via the second communication path 11. The main control unit 8 determines whether the number of revolutions specified by the data transmitted from the motor-driving control unit 9 is equal to or smaller than the threshold (S29). The threshold is, for example, 500 rpm.

When determining that the number of revolutions of the free-run of the motor 7 is equal to or smaller than the threshold (Yes at S29), the main control unit 8 transmits a brake signal for forcibly stopping the rotation of the motor 7 to the motor-driving control unit 9. The motor-driving control unit 9 outputs a brake signal for forcibly stopping the rotation of the motor 7 to the inverter output unit 12. The inverter output unit 12 forcibly stops the rotation of the motor 7 on the basis of the brake signal (S30). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S31).

When determining that the number of revolutions of the free-run of the motor 7 is larger than the threshold (No at S29), the main control unit 8 causes the motor 7 to continue the free-run (S32). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S33).

When the motor-driving control unit 9 cannot receive the data from the main control unit 8 even if the third time elapses since outputting the instruction for stopping the rotation of the motor 7 to the inverter output unit 12 and does not transmit a response to the main control unit 8 (No at S28), that is, when the motor-driving control unit 9 cannot receive the data from the main control unit 8 before the third time elapses since the operation for stopping the rotation of the motor 7 is started and does not transmit a response to the main control unit 8 (No at S28), the main control unit 8 stops the operation of the power supply unit 13 to stop the supply of the electric power to the motor-driving control unit 9 and the inverter output unit 12 (S34). After a fourth time determined in advance elapses since the operation of the power supply unit 13 is stopped, the main control unit 8 restarts the power supply unit 13 to supply electric power to the motor-driving control unit 9 and the inverter output unit 12 (S34). The motor-driving control unit 9 restarts because the electric power is supplied. The fourth time is, for example, 1000 milliseconds.

When the motor-driving control unit 9 can receive the data from the main control unit 8 before a fifth time determined in advance elapses since restarting and transmits a response to the main control unit 8 (Yes at S35), that is, when the state of the communication from the main control unit 8 to the motor-driving control unit 9 is restored before the fifth time elapses since the main control unit 8 restarts the power supply unit 13 (Yes at S35), the main control unit 8 performs operation at step S36 explained below. The fifth time is, for example, 5000 milliseconds.

The main control unit 8 determines whether the number of revolutions of the free-run of the motor 7 is equal to or smaller than the threshold (S36). Specifically, the number of revolutions of the free-run of the motor 7 is detected by the detecting unit 14. The motor-driving control unit 9 transmits data for specifying the number of revolutions detected by the detecting unit 14 to the main control unit 8 via the second communication path 11. The main control unit 8 determines whether the number of revolutions specified by the data transmitted from the motor-driving control unit 9 is equal to or smaller than the threshold (S36).

When determining that the number of revolutions of the free-run of the motor 7 is equal to or smaller than the threshold (Yes at S36), the main control unit 8 transmits a brake signal for forcibly stopping the rotation of the motor 7 to the motor-driving control unit 9. The motor-driving control unit 9 outputs a brake signal for forcibly stopping the rotation of the motor 7 to the inverter output unit 12. The inverter output unit 12 forcibly stops the rotation of the motor 7 on the basis of the brake signal (S37). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S38).

When determining that the number of revolutions of the free-run of the motor 7 is larger than the threshold (No at S36), the main control unit 8 causes the motor 7 to continue the free-run (S39). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S40).

When the motor-driving control unit 9 cannot receive the data from the main control unit 8 even if the fifth time elapses since restarting and does not transmit a response to the main control unit 8 (No at S35), that is, when the state of the communication from the main control unit 8 to the motor-driving control unit 9 is not restored even if the fifth time elapses since the main control unit 8 restarts the power supply unit 13 (No at S35), the main control unit 8 stops the operation of the power supply unit 13 to stop the supply of the electric power to the motor-driving control unit 9 and the inverter output unit 12 (S41). In addition, the main control unit 8 causes the display unit 3 to display information indicating that abnormality of the communication from the main control unit 8 to the motor-driving control unit 9 occurs (S41).

Figure 7:
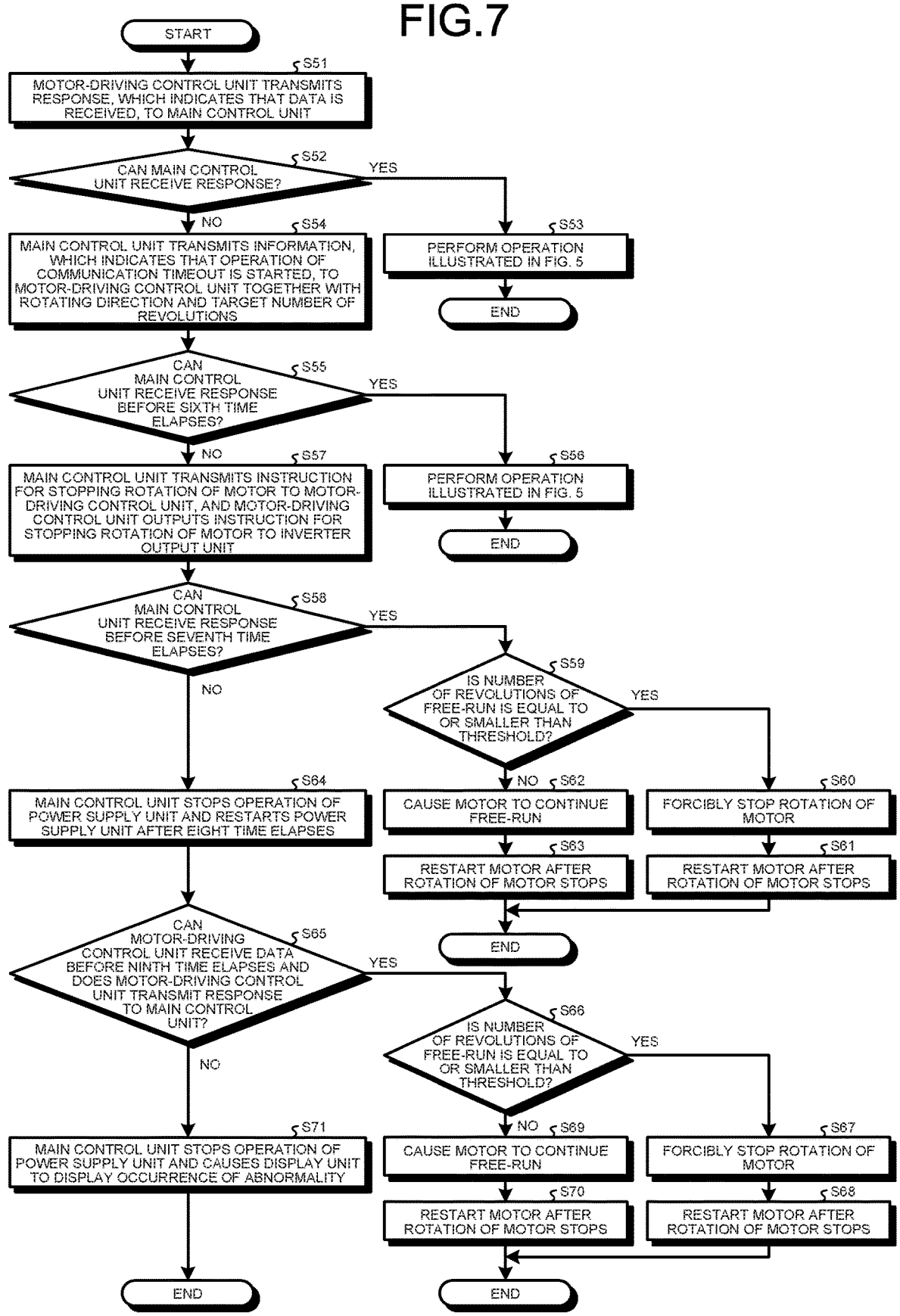
FIG. 7 is a flowchart illustrating a procedure of the operation of the air conditioner in the embodiment at the time when abnormality occurs in transmission of information from the motor-driving control unit to the main control unit.

The operation of the air conditioner 1 at the time when abnormality occurs in transmission of information from the motor-driving control unit 9 to the main control unit 8 will be explained. FIG. 7 is a flowchart illustrating a procedure of the operation of the air conditioner 1 in the embodiment at the time when abnormality occurs in the transmission of the information from the motor-driving control unit 9 to the main control unit 8. The motor-driving control unit 9 receives data transmitted from the main control unit 8 and transmits a response, which indicates that the data is received, to the main control unit 8 via the second communication path 11 (S51). An example of the data is an instruction for rotating the motor 7.

When the main control unit 8 can receive the response transmitted from the motor-driving control unit 9 (Yes at S52), the air conditioner 1 performs the operation explained with reference to FIG. 5 (S53). When the main control unit 8 cannot receive the response transmitted from the motor-driving control unit 9 (No at S52), that is, when main control unit 8 does not receive the response transmitted from the motor-driving control unit 9 because abnormality occurs in the second communication path 11 (No at S52), the main control unit 8 performs operation at step S54 explained below.

Even if the main control unit 8 cannot receive the response from the motor-driving control unit 9 (No at S52), the main control unit 8 continues to transmit the data to the motor-driving control unit 9 at every first time described above. When the main control unit 8 transmits data to the motor-driving control unit 9 after the first time since transmitting data corresponding to the response that cannot be received, the main control unit 8 transmits information for specifying a rotating direction and a target number of revolutions of the motor 7 and information indicating that operation of timeout of communication is started to the motor-driving control unit 9 (S54).

The motor-driving control unit 9 outputs, to the inverter output unit 12, an instruction for rotating the motor 7 in the rotating direction and at the target number of revolutions specified by the information received from the main control unit 8. The inverter output unit 12 outputs, to the motor 7, a signal for rotating the motor 7 in the rotating direction and at the target number of revolutions in the instruction output from the motor-driving control unit 9. The motor 7 rotates in the rotating direction and at the target number of revolutions. In addition, the motor-driving control unit 9 starts counting of timeout of communication.

When the main control unit 8 receives a response from the motor-driving control unit 9 before a time determined in advance elapses since transmitting the information indicating that the operation of the timeout of the communication starts to the motor-driving control unit 9 (Yes at S55), the air conditioner 1 performs operation explained with reference to FIG. 5 (S56). An end point of the time determined in advance in the case of Yes at step S55 is a point in time when a sixth time longer than the first time elapses since an instruction for rotating the motor 7 is transmitted from the main control unit 8 to the motor-driving control unit 9 first. The sixth time is, for example, 5000 milliseconds.

When the main control unit 8 does not receives a response from the motor-driving control unit 9 even if the sixth time elapses since transmitting the information indicating that the operation of the timeout of the communication starts to the motor-driving control unit 9 (No at S55), the main control unit 8 transmits an instruction for stopping the rotation of the motor 7 to the motor-driving control unit 9. The motor-driving control unit 9 outputs an instruction for stopping the rotation of the motor 7 to the inverter output unit 12 (S57). The inverter output unit 12 outputs a signal for stopping the rotation of the motor 7 to the motor 7. The motor 7 starts operation for stopping the rotation. When a count of the timeout of the communication reaches the number of time determined in advance, the motor-driving control unit 9 discards data received from the main control unit 8 last time.

When the main control unit 8 can receive a response from the motor-driving control unit 9 before a seventh time determined in advance elapses since transmitting the instruction for stopping the rotation of the motor 7 to the motor-driving control unit 9 (Yes at S58), that is, when a state of communication from the motor-driving control unit 9 to the main control unit 8 is restored before the seventh time elapses since the main control unit 8 transmits the instruction for stopping the rotation of the motor 7 to the motor-driving control unit 9 (Yes at S58), the main control unit 8 determines whether the number of revolutions of the free-run of the motor 7 is equal to or smaller than the threshold (S59). The seventh time is, for example, 5000 milliseconds.

Specifically, the number of revolutions of the free-run of the motor 7 is detected by the detecting unit 14. The motor-driving control unit 9 transmits data for specifying the number of revolutions detected by the detecting unit 14 to the main control unit 8 via the second communication path 11. The main control unit 8 determines whether the number of revolutions specified by the data transmitted from the motor-driving control unit 9 is equal to or smaller than the threshold (S59).

When determining that the number of revolutions of the free-run of the motor 7 is equal to or smaller than the threshold (Yes at S59), the main control unit 8 transmits a brake signal for forcibly stopping the rotation of the motor 7 to the motor-driving control unit 9. The motor-driving control unit 9 outputs a brake signal for forcibly stopping the rotation of the motor 7 to the inverter output unit 12. The inverter output unit 12 forcibly stops the rotation of the motor 7 on the basis of the brake signal (S60). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S61).

When determining that the number of revolutions of the free-run of the motor 7 is larger than the threshold (No at S59), the main control unit 8 causes the motor 7 to continue the free-run (S62). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S63).

When the main control unit 8 cannot receive a response from the motor-driving control unit 9 even if the seventh time elapses since transmitting the instruction for stopping the rotation of the motor 7 to the motor-driving control unit 9 (No at S58), that is, when the state of the communication from the motor-driving control unit 9 to the main control unit 8 is not restored before the seventh time elapses since the main control unit 8 transmits the instruction for stopping the rotation of the motor 7 to the motor-driving control unit 9 (No at S58), the main control unit 8 performs operation at step S64 explained below.

That is, the main control unit 8 stops the operation of the power supply unit 13 to stop the supply of the electric power to the motor-driving control unit 9 and the inverter output unit 12 (S64). After an eighth time determined in advance elapses since the operation of the power supply unit 13 is stopped, the main control unit 8 restarts the power supply unit 13 to supply electric power to the motor-driving control unit 9 and the inverter output unit 12 (S64). The motor-driving control unit 9 restarts because the electric power is supplied. The eighth time is, for example, 1000 milliseconds.

When the main control unit 8 transmits the data to the motor-driving control unit 9 before a ninth time determined in advance elapses since the motor-driving control unit 9 restarts and the motor-driving control unit 9 can receive the data transmitted from the main control unit 8 and transmits a response, which indicates that the data is received, to the main control unit 8 (Yes at S65), that is, when the state of the communication from the motor-driving control unit 9 to the main control unit 8 is restored before the ninth time elapses since the motor-driving control unit 9 restarts (Yes at S65), the main control unit 8 determines whether the number of revolutions of the free-run of the main control unit 8 is equal to or smaller than the threshold (S66). The ninth time is, for example, 5000 milliseconds.

Specifically, the number of revolutions of the free-run of the motor 7 is detected by the detecting unit 14. The motor-driving control unit 9 transmits data for specifying the number of revolutions detected by the detecting unit 14 to the main control unit 8 via the second communication path 11. The main control unit 8 determines whether the number of revolutions specified by the data transmitted from the motor-driving control unit 9 is equal to or smaller than the threshold (S66).

When determining that the number of revolutions of the free-run of the motor 7 is equal to or smaller than the threshold (Yes at S66), the main control unit 8 transmits a brake signal for forcibly stopping the rotation of the motor 7 to the motor-driving control unit 9. The motor-driving control unit 9 outputs a brake signal for forcibly stopping the rotation of the motor 7 to the inverter output unit 12. The inverter output unit 12 forcibly stops the rotation of the motor 7 on the basis of the brake signal (S67). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S68).

When determining that the number of revolutions of the free-run of the motor 7 is larger than the threshold (No at S66), the main control unit 8 causes the motor 7 to continue the free-run (S69). After the rotation of the motor 7 stops, the main control unit 8 transmits an instruction for rotating the motor 7 to the motor-driving control unit 9. The motor-driving control unit 9 outputs an instruction for rotating the motor 7 to the inverter output unit 12 and restarts the motor 7 (S70).

When the main control unit 8 transmits the data to the motor-driving control unit 9 before the ninth time elapses since the motor-driving control unit 9 restarts and the motor-driving control unit 9 cannot receive the data transmitted from the main control unit 8 and does not transmit a response, which indicates that the data is received, to the main control unit 8 (No at S65), that is, when the state of the communication from the motor-driving control unit 9 to the main control unit 8 is not restored before the ninth time elapses since the motor-driving control unit 9 restarts (No at S65), the main control unit 8 stops the operation of the power supply unit 13 to stop the supply of the electric power to the motor-driving control unit 9 and the inverter output unit 12 (S71). In addition, the main control unit 8 causes the display unit 3 to display information indicating that abnormality of the communication from the motor-driving control unit 9 to the main control unit 8 occurs (S71).

As explained above, when the motor-driving control unit 9 does not receive the instruction for rotating the motor 7 from the main control unit 8 before the first time elapses since receiving the last instruction for rotating the motor 7 transmitted from the main control unit 8, the motor-driving control unit 9 outputs the instruction for continuing the operation based on the last instruction to the inverter output unit 12. The motor 7 continues the operation based on the last instruction according to the instruction for continuing the operation. That is, the air conditioner 1 can continue the operation rather than immediately stopping the operation even if the communication between the main control unit 8 and the motor-driving control unit 9 becomes abnormal. As explained above, the last instruction is the instruction for rotating the motor 7 received at the immediately preceding time from the main control unit 8 by the motor-driving control unit 9 when the motor-driving control unit 9 does not receive a new instruction for rotating the motor 7 from the main control unit 8 before the first time elapses from the time when the motor-driving control unit 9 receives the instruction for rotating the motor 7 from the main control unit 8 last.

When the motor-driving control unit 9 can receive the data from the main control unit 8 before the second time longer than the first time elapses since receiving the last instruction from the main control unit 8 and transmits the response, which indicates that the data is received, to the main control unit 8, the air conditioner 1 performs the operation explained with reference to FIG. 5. That is, when the motor-driving control unit 9 can receive the data from the main control unit 8 before the second time elapses, the air conditioner 1 can continuously execute the operation at the time when the communication between the main control unit 8 and the motor-driving control unit 9 is normal. That is, the air conditioner 1 can appropriately operate rather than immediately stopping the operation even if the communication between the main control unit 8 and the motor-driving control unit 9 becomes abnormal.

Further, even if the motor-driving control unit 9 does not receive the instruction for rotating the motor 7 from the main control unit 8 before the first time elapses since receiving the last instruction for rotating the motor 7 transmitted from the main control unit 8, if the state of the communication between the main control unit 8 and the motor-driving control unit 9 is restored after the first time elapses, the air conditioner 1 stops the motor 7 at least once. However, even if a time in which a state of the communication between the main control unit 8 and the motor-driving control unit 9 is not normal continues, if the state of the communication is restored, the air conditioner 1 can perform the appropriate operation again.

If a state in which the communication between the main control unit 8 and the motor-driving control unit 9 is not normally performed continues, the air conditioner 1 stops the operation. Therefore, even if abnormality occurs in the communication, the entire air conditioner 1 is prevented from becoming abnormal. In addition, if the state in which the communication is not normally performed continues, the air conditioner 1 causes the display unit 3 to display information indicating that the abnormality of the communication occurs. According to the information displayed on the display unit 3, the user can relatively quickly recognize that the abnormality of the communication occurs and can relatively quickly cope with the abnormality of the communication.

Note that each of the first time, the second time, the third time, the fourth time, the fifth time, the sixth time, the seventh time, the eighth time, and the ninth time is determined by, for example, an experiment.

In the embodiment explained above, when determining that the number of revolutions of the free-run of the motor 7 is larger than the threshold, the main control unit 8 causes the motor 7 to continue the free-run. However, when the number of revolutions of the motor 7 is equal to or smaller than the threshold, the main control unit 8 can transmit the brake signal for forcibly stopping the rotation of the motor 7 to the motor-driving control unit 9 rather than waiting for the rotation of the motor 7 to naturally stop. In that case, the motor-driving control unit 9 outputs, on the basis of the brake signal transmitted from the main control unit 8, the brake signal for forcibly stopping the rotation of the motor 7 to the inverter output unit 12. The inverter output unit 12 forcibly stops the rotation of the motor 7 on the basis of the brake signal output from the motor-driving control unit 9.

In the embodiment explained above, the air conditioner 1 further includes the detecting unit 14 that detects a rotating direction and the number of revolutions of the motor 7. The detecting unit 14 can detect only the number of revolutions of the motor 7. The motor 7 can be a sensor-less motor that can cause means other than the detecting unit 14 to detect a rotating direction and the number of revolutions. In that case, the air conditioner 1 includes, instead of the detecting unit 14, means for detecting a rotating direction and the number of revolutions of the motor 7.

The configuration explained in the embodiment indicates an example of the content of the present invention. The configuration can be combined with another known technology. A part of the configuration can be omitted or changed in a range not departing from the spirit of the present invention.

REFERENCE SIGNS LIST 1 air conditioner, 2 commercial power supply, 3 display unit, 4 power generating unit, 5 power-supply circuit unit, 6 fan, 7 motor, 8 main control unit, 9 motor-driving control unit, 10 first communication path, second communication path, 12 inverter output unit, 13 power supply unit, 14 detecting unit, 21 processing circuit, 31 memory, 32 processor.

The invention claimed is:

1. An air conditioner comprising:
a main controller to perform control for rotating a motor;
a motor-driving controller to perform, on a basis of the control by the main controller, control for rotating the motor;
an inverter transmitter to output, on a basis of the control by the motor-driving controller, a signal for rotating the motor to the motor; and
a power supply to supply electric power to the motor-driving controller and the inverter transmitter, wherein
the main controller transmits, at every first time, an instruction for rotating the motor to the motor-driving controller,
the motor-driving controller outputs, on a basis of the instruction for rotating the motor transmitted from the main controller, an instruction for rotating the motor to the inverter transmitter,
when the motor-driving controller does not receive a new instruction for rotating the motor from the main controller before the first time elapses from a time when the motor-driving controller receives the instruction for rotating the motor from the main controller last, the motor-driving controller outputs an instruction for continuing operation based on an instruction for rotating the motor received from the main controller at an immediately preceding time to the inverter transmitter,
when the motor-driving controller does not receive the instruction for rotating the motor from the main controller even if a second time longer than the first time elapses since receiving the instruction for rotating the motor from the main controller last, the motor-driving controller outputs an instruction for stopping the rotation of the motor to the inverter transmitter, and
when a state of communication from the main controller to the motor-driving controller is restored before a third time elapses since the motor-driving controller outputs the instruction for stopping the rotation of the motor to the inverter transmitter, after the rotation of the motor stops, the main controller transmits the instruction for rotating the motor to the motor-driving controller, and the motor-driving controller outputs the instruction for rotating the motor to the inverter transmitter.

2. An air conditioner comprising:
a main controller to perform control for rotating a motor;
a motor-driving controller to perform, on a basis of the control by the main controller, control for rotating the motor;
an inverter transmitter to output, on a basis of the control by the motor-driving controller, a signal for rotating the motor to the motor; and
a power supply to supply electric power to the motor-driving controller and the inverter transmitter, wherein the main controller transmits, at every first time, an instruction for rotating the motor to the motor-driving controller, the motor-driving controller outputs, on a basis of the instruction for rotating the motor transmitted from the main controller, an instruction for rotating the motor to the inverter transmitter, when the motor-driving controller does not receive a new instruction for rotating the motor from the main controller before the first time elapses from a time when the motor-driving controller receives the instruction for rotating the motor from the main controller last, the motor-driving controller outputs an instruction for continuing operation based on an instruction for rotating the motor received from the main controller at an immediately preceding time to the inverter transmitter, when the motor-driving controller does not receive the instruction for rotating the motor from the main controller even if a second time longer than the first time elapses since receiving the instruction for rotating the motor from the main controller last, the motor-driving controller outputs an instruction for stopping the rotation of the motor to the inverter transmitter, when the motor-driving controller does not receive the instruction for rotating the motor from the main controller even if a third time elapses since outputting the instruction for stopping the rotation of the motor to the inverter transmitter, the main controller stops operation of the power supply and stops the supply of the electric power to the motor-driving controller and the inverter transmitter and, after a fourth time elapses since the main controller stops the operation of the power supply, operates the power supply to supply electric power to the motor-driving controller and the inverter transmitter, and when a state of communication from the main controller to the motor-driving controller is restored before a fifth time elapses since the fourth time elapses and the main controller operates the power supply, after the rotation of the motor stops, the main controller transmits the instruction for rotating the motor to the motor-driving controller, and the motor-driving controller outputs the instruction for rotating the motor to the inverter transmitter.

3. The air conditioner according to claim 1, further comprising a detector to detect the number of revolutions of the motor, wherein when the state of the communication from the main controller to the motor-driving controller is restored, the motor-driving controller transmits data for specifying the number of revolutions detected by the detector to the main controller, the main controller transmits a brake signal for stopping the rotation of the motor to the motor-driving controller when the number of revolutions specified by the data is equal to or smaller than a threshold, the motor-driving controller outputs a brake signal for stopping the rotation of the motor to the inverter transmitter, and the inverter transmitter stops the rotation of the motor on a basis of the brake signal.

4. An air conditioner comprising:

a main controller to perform control for rotating a motor;

a motor-driving controller to perform, on a basis of the control by the main controller, control for rotating the motor;

an inverter transmitter to output, on a basis of the control by the motor-driving controller, a signal for rotating the motor to the motor; and a power supply to supply electric power to the motor-driving controller and the inverter transmitter, wherein the main controller transmits, at every first time, an instruction for rotating the motor to the motor-driving controller, the motor-driving controller outputs, on a basis of the instruction for rotating the motor transmitted from the main controller, an instruction for rotating the motor to the inverter transmitter, when the motor-driving controller does not receive a new instruction for rotating the motor from the main controller before the first time elapses from a time when the motor-driving controller receives the instruction for rotating the motor from the main controller last, the motor-driving controller outputs an instruction for continuing operation based on an instruction for rotating the motor received from the main controller at an immediately preceding time to the inverter transmitter, when the motor-driving controller does not receive the instruction for rotating the motor from the main controller even if a second time longer than the first time elapses since receiving the instruction for rotating the motor from the main controller last, the motor-driving controller outputs an instruction for stopping the rotation of the motor to the inverter transmitter, when the motor-driving controller does not receive the instruction for rotating the motor from the main controller even if a third time elapses since outputting the instruction for stopping the rotation of the motor to the inverter transmitter, the main controller stops operation of the power supply and stops the supply of the electric power to the motor-driving controller and the inverter transmitter and, after a fourth time elapses since the main controller stops the operation of the power supply, operates the power supply to supply electric power to the motor-driving controller and the inverter transmitter, and when a state of communication from the main controller to the motor-driving controller is not restored even if a fifth time elapses since the fourth time elapses and the main controller operates the power supply, the main controller stops operation of the power supply to stop the supply of the electric power to the motor-driving controller and the inverter transmitter and causes a display to display information indicating that abnormality occurs.

5. The air conditioner according to claim 1, further comprising a power supply to supply electric power to the motor-driving controller and the inverter transmitter, wherein every time the motor-driving controller receives the instruction for rotating the motor from the main controller, the motor-driving controller transmits a response, which indicates that the instruction is received, to the main controller, and even if the main controller does not receive the response from the motor-driving controller after transmitting the instruction for rotating the motor to the motor-driving controller, the main controller continues to transmit the instruction for rotating the motor to the motor-driving controller, when the main controller does not receive the response even if a sixth time longer than the first time elapses, transmits an instruction for stopping the rotation of the motor to the motor-driving controller, and, when a state of communication from the motor-driving controller to the main controller is restored before a seventh time elapses since transmitting the instruction for stopping the rotation of the motor to the motor-driving controller, after the rotation of the motor stops, transmits the instruction for rotating the motor to the motor-driving controller, and the motor-driving controller outputs the instruction for rotating the motor to the inverter transmitter.

6. The air conditioner according to claim 1, further comprising a power supply to supply electric power to the motor-driving controller and the inverter transmitter, wherein every time the motor-driving controller receives the instruction for rotating the motor from the main controller, the motor-driving controller transmits a response, which indicates that the instruction is received, to the main controller, even if the main controller does not receive the response from the motor-driving controller after transmitting the instruction for rotating the motor to the motor-driving controller, the main controller continues to transmit the instruction for rotating the motor to the motor-driving controller, when the main controller does not receive the response even if a sixth time longer than the first time elapses, transmits an instruction for stopping the rotation of the motor to the motor-driving controller, and, when a state of communication from the motor-driving controller to the main controller is not restored before a seventh time elapses since transmitting the instruction for stopping the rotation of the motor to the motor-driving controller, stops operation of the power supply to stop the supply of the electric power to the motor-driving controller and the inverter transmitter, and, after an eighth time elapses since the operation of the power supply is stopped, operates the power supply to supply electric power to the motor-driving controller and the inverter transmitter, and when a state of communication from the main controller to the motor-driving controller is restored before a ninth time elapses since the eighth time elapses and the main controller operates the power supply, after the rotation of the motor stops, the main controller transmits the instruction for rotating the motor to the motor-driving controller, and the motor-driving controller outputs the instruction for rotating the motor to the inverter transmitter.

7. The air conditioner according to claim 5, further comprising a detector to detect the number of revolutions of the motor, wherein when the state of the communication from the main controller to the motor-driving controller is restored, the motor-driving controller transmits data for specifying the number of revolutions detected by the detector to the main controller, the main controller transmits a brake signal for stopping the rotation of the motor to the motor-driving controller when the number of revolutions specified by the data is equal to or smaller than a threshold, the motor-driving controller outputs a brake signal for stopping the rotation of the motor to the inverter transmitter, and the inverter transmitter stops the rotation of the motor on a basis of the brake signal.

8. The air conditioner according to claim 1, further comprising a power supply to supply electric power to the motor-driving controller and the inverter transmitter, wherein every time the motor-driving controller receives the instruction for rotating the motor from the main controller, the motor-driving controller transmits a response, which indicates that the instruction is received, to the main controller, even if the main controller does not receive the response from the motor-driving controller after transmitting the instruction for rotating the motor to the motor-driving controller, the main controller continues to transmit the instruction for rotating the motor to the motor-driving controller, when the main controller does not receive the response even if a sixth time longer than the first time elapses, transmits an instruction for stopping the rotation of the motor to the motor-driving controller, and, when a state of communication from the motor-driving controller to the main controller is not restored before a seventh time elapses since transmitting the instruction for stopping the rotation of the motor to the motor-driving controller, stops operation of the power supply to stop the supply of the electric power to the motor-driving controller and the inverter transmitter, and, after an eighth time elapses since the operation of the power supply is stopped, operates the power supply to supply electric power to the motor-driving controller and the inverter transmitter, and when a state of communication from the main controller to the motor-driving controller is not restored even if a ninth time elapses since the eighth time elapses and the main controller operates the power supply, the main controller stops operation of the power supply to stop the supply of the electric power to the motor-driving controller and the inverter transmitter and causes a display to display information indicating that abnormality occurs.

9. The air conditioner according to claim 2, further comprising a detector to detect the number of revolutions of the motor, wherein when the state of the communication from the main controller to the motor-driving controller is restored, the motor-driving controller transmits data for specifying the number of revolutions detected by the detector to the main controller, the main controller transmits a brake signal for stopping the rotation of the motor to the motor-driving controller when the number of revolutions specified by the data is equal to or smaller than a threshold, the motor-driving controller outputs a brake signal for stopping the rotation of the motor to the inverter transmitter, and the inverter transmitter stops the rotation of the motor on a basis of the brake signal.

10. The air conditioner according to claim 6, further comprising a detector to detect the number of revolutions of the motor, wherein when the state of the communication from the main controller to the motor-driving controller is restored, the motor-driving controller transmits data for specifying the number of revolutions detected by the detector to the main controller, the main controller transmits a brake signal for stopping the rotation of the motor to the motor-driving controller when the number of revolutions specified by the data is equal to or smaller than a threshold, the motor-driving controller outputs a brake signal for stopping the rotation of the motor to the inverter transmitter, and the inverter transmitter stops the rotation of the motor on a basis of the brake signal.

\* \* \* \* \*